United States Patent
Wix et al.

(10) Patent No.: US 10,525,428 B2
(45) Date of Patent: Jan. 7, 2020

(54) BOILING WATER REACTOR

(71) Applicant: Haldor Topsøe A/S, Kgs. Lyngby (DK)

(72) Inventors: Christian Wix, Nærum (DK); Michael Boe, Klampenborg (DK)

(73) Assignee: Haldor Topsoe A/S, Lyngby (DK)

( * ) Notice: Subject to any disclaimer, the term of this patent is extended or adjusted under 35 U.S.C. 154(b) by 147 days.

(21) Appl. No.: 15/549,730

(22) PCT Filed: Mar. 18, 2016

(86) PCT No.: PCT/EP2016/055982
§ 371 (c)(1),
(2) Date: Aug. 9, 2017

(87) PCT Pub. No.: WO2016/150858
PCT Pub. Date: Sep. 29, 2016

(65) Prior Publication Data
US 2018/0028997 A1 Feb. 1, 2018

(30) Foreign Application Priority Data
Mar. 20, 2015 (DK) .................. 2015 00170

(51) Int. Cl.
*B01J 8/06* (2006.01)
*B01J 4/00* (2006.01)

(52) U.S. Cl.
CPC ............... *B01J 8/065* (2013.01); *B01J 4/001* (2013.01); *B01J 8/067* (2013.01); *B01J 2208/00017* (2013.01); *B01J 2208/00238* (2013.01); *B01J 2208/06* (2013.01); *B01J 2208/065* (2013.01)

(58) Field of Classification Search
CPC ....................................................... B01J 8/065
See application file for complete search history.

(56) References Cited

U.S. PATENT DOCUMENTS

| 2,353,600 A * | 7/1944 | Sweetser .................. B01J 8/003 422/202 |
| 5,000,926 A | 3/1991 | Murayama et al. |
| 6,905,660 B2 * | 6/2005 | Harper ..................... B01J 8/003 141/236 |
| 2001/0046463 A1 | 11/2001 | Harper et al. |
| 2004/0105795 A1 | 6/2004 | Gough |

(Continued)

FOREIGN PATENT DOCUMENTS

| DE | 4031514 A1 * | 4/1992 | ............... B01J 8/06 |
| DE | 198 06 810 A1 | 8/1999 | |

(Continued)

OTHER PUBLICATIONS

Machine translation for DE 4031514 A1. Retrieved from Espacenet website on Oct. 28, 2019. (Year: 2019).*

*Primary Examiner* — Jennifer A Leung
(74) *Attorney, Agent, or Firm* — Blank Rome LLP

(57) ABSTRACT

The invention relates to a boiling water reactor for an exothermal reaction. The reactor comprises reactant by-pass inserts arranged on top of the upper tube sheet to provide for a catalyst layer on top of the upper tube sheet and also a cooling stream of reactant by-passing the upper layer of catalyst and cooling the upper tube sheet from the temperature rise due to the exothermal reaction taking place in the upper layer of catalyst.

11 Claims, 2 Drawing Sheets

(56) References Cited

U.S. PATENT DOCUMENTS

| | | | |
|---|---|---|---|
| 2004/0261898 A1 * | 12/2004 | Goemans | B01J 8/003 |
| | | | 141/234 |
| 2006/0041030 A1 | 2/2006 | Lehr et al. | |
| 2006/0054242 A1 * | 3/2006 | Goemans | B01J 8/002 |
| | | | 141/237 |
| 2012/0277327 A1 * | 11/2012 | Han | B01J 8/067 |
| | | | 518/702 |
| 2013/0287652 A1 | 10/2013 | Lehr et al. | |

FOREIGN PATENT DOCUMENTS

| | | | | |
|---|---|---|---|---|
| GB | 765025 A | * | 1/1957 | B01J 8/062 |
| GB | 2460514 A | | 12/2009 | |
| WO | WO 01/85332 A1 | | 11/2001 | |
| WO | WO 2008/144409 A2 | | 11/2008 | |

* cited by examiner

BOILING WATER REACTOR

FIELD OF THE INVENTION

Embodiments of the invention generally relate to a boiling water reactor for an exothermal reaction. More specifically, the invention relates to ensure cooling of a catalyst covering the upper tube sheet of a boiling water reactor.

BACKGROUND

The typical design of a boiling water reactor involves a multitude of tubes inside a reactor shell. A confined part of the reactor shell is filled with a cooling medium under pressure. Often water is used as cooling medium, but other cooling media than water may also be used if the boiling point is appropriate. The pressure of the confined part of the reactor shell controls the boiling point of the cooling medium, which then, if operating at the boiling point, may act as a heat sink with substantially constant temperature, to the extent that liquid cooling medium is present in the reactor. The cooling medium may be provided to the reactor shell from an external cooling medium container, such as e.g. a steam drum.

Common chemical processes where boiling water reactors are of interest include methane, methanol and formaldehyde production from synthesis gas, i.e. a gas comprising hydrogen and carbon oxides and possibly other constituents. The synthesis gas may originate from a variety of sources, including gasification of carbonaceous materials, such as coal, (typically heavy) hydrocarbons, solid waste and biomass, from reforming of hydrocarbons, from coke oven waste gas, from biogas or from combination of streams rich in carbon oxides and hydrogen—e.g. of electrolytic origin. Methane and methanol production are limited by an equilibrium involving a condensable component and for formaldehyde production it is desired to maintain the methanol concentration low due to considerations of explosion limits and catalyst stability, a.o.

To increase the capacity of a boiling water reactor, the catalyst is in some cases loaded not only into the reaction tubes, but also further up above the upper tube sheet wherein the reaction tubes are mounted. Regarding exothermic reactions, this increases the reactant gas temperature even before the reactant reaches the reaction tubes which are in thermal contact with the cooling medium. Thus there is a risk that the temperature of the tube sheet gets too high with risk of damage to the tube sheet. The present invention relates to a solution to this problem, avoiding a critically high temperature of the upper tube sheet even with catalyst loaded above the tube sheet for an exothermic reaction in the boiling water reactor. Another advantage of the present invention is that it can compensate for shrinkage of the catalyst within the reaction tubes, as the layer of catalyst arranged above the upper tube sheet will sink into the reaction tubes in case of catalyst shrinkage.

Known art offers little solution to this problem, as can be seen in the following references, where:

U.S. Pat. No. 5,000,926 describes a catalyst layer-fixed reactor for an exothermic reaction which comprises a plurality of reaction tubes disposed within a shell of the reactor, an inner tube disposed in the middle portion of each of the reaction tubes, catalyst layers formed by catalyst charged in the space inside the reaction tubes and outside the inner tubes, and a cooling medium charged between each of the reaction tubes and the shell, and in which a feed gas is flowed in each of the inner tubes in co-current to feed gas flowing in the fixed catalyst layer.

U.S. Pat. No. 5,759,500 discloses a fluid-reactor, heat exchange device and method of reacting a fluid in the device. The device embodies a bundle of heat-exchange tubes mounted internally of an elongated reactor shell to a stationary tube sheet attached to the reactor shell near one end of the shell. The heat-exchange tubes are also mounted to a floating tube-sheet which is located near the other end of the shell. Attached to the floating tube sheet is a catalyst basket which when the device is in operation will contain catalyst. The catalyst is supported in the basket, and the fluid to be reacted will enter the shell near the point of attachment to the stationary tube sheet, where it will contact the heat exchange tubes. The fluid will flow along the outside of the tubes and into the catalyst basket where it will contact the catalyst and react. The fluid will then pass into the heat exchange tubes and finally be removed from the device near the end of the reactor where it was introduced.

In EP1048343A2 a heat-exchanger type reactor is described, which has a plurality of tubes holding a catalyst, a shell section through which a heat-transfer medium is passed to carry out heat-transfer with a reaction fluid in said tubes, and upper and lower tube sheets, the upper ends of said tubes being joined to said upper tube sheet by way of first expansion joints fixed to the upper side of said upper tube sheet, the lower ends of said tubes being fixed directly to the floatable lower tube sheet, a floatable room being formed which is partitioned by said lower tube sheet and an inner end plate (inner head) joined to the lower side thereof and has an opening in the lower part, and said opening being joined by way of a second expansion joint to a tube-side outlet to the outside of the reactor.

None of the above known art references offer a solution to the mentioned problem as described in the following.

In the following, a section of the reactor is called reaction enclosure. However this shall not necessarily be construed as implying that a reaction takes place, since a reaction enclosure may simply have the function of a heat exchanger.

In the following, tubes shall be construed as enclosures of any circumferential shape, only characterized by being longer than the cross sectional distance. Typically tubes are cylindrical, but they may also have non-circular cross sectional shapes and varying cross sectional shape over the tube length.

SUMMARY OF THE INVENTION

Embodiments of the invention generally relate to a boiling water reactor for an exothermal reaction. The reactor comprises a reactor shell having a reactor shell volume, the reactor shell volume comprising at least one cooling medium inlet and at least one cooling medium outlet. The reactor shell volume is arranged to hold a cooling medium under pressure. The reactor shell comprises a reactant inlet and a product outlet. The boiling water reactor further comprises a reaction enclosure embedded within the reactor shell volume. The reaction enclosure comprises a reaction zone with a plurality of reaction tubes, an inlet manifold extending between the reactant inlet and the reaction zone, and an outlet manifold extending between the reaction zone and the product outlet. The cooling medium is arranged to flow between the cooling medium inlet and the cooling medium outlet, around the reaction tubes, so that the reaction tubes are in thermal contact with the cooling medium. The reactor shell volume is dimensioned so as to allow boiling of a liquid phase of the cooling medium within the reactor shell volume. A mixture of steam and water may pass through at least one cooling medium outlet to an external steam drum for separation of the liquid and the gas phase.

In general, temperature of the cooling medium is controlled by control of its pressure, and the cooling medium is typically kept at a temperature proximate to the boiling point of the cooling medium.

The term "reactor shell" shall be construed as covering the casing or the walls of the reactor, whilst the term "reactor shell volume" is to be construed as covering the room or space within the reactor.

In an embodiment of the invention a boiling water reactor for an exothermal reaction comprises a reactor shell with a reactor shell volume arranged to hold a cooling medium under pressure. The cooling medium may be water or another liquid with a boiling point suitable for the process. The reactor shell volume comprises at least one cooling medium inlet and at least one cooling medium outlet and a reactant inlet and a product outlet. A reaction enclosure is embedded within the reactor shell volume and comprises a reaction zone with a plurality of reaction tubes for holding catalyst within the tubes. The catalyst may in some embodiments be SNG catalyst or a methanol catalyst, but any catalyst suitable for the process may be used in the present invention. The reactor further comprises an inlet manifold extending between the reactant inlet and the reaction zone, and an outlet manifold extending between said reaction zone and said product outlet. Within the reactor there is at least an upper and a lower tube sheet, comprising holes for connection of each end of the reaction tubes to said tube sheets. The reaction tubes may be connected to the tube sheets in any suitable way known in the art. The cooling medium is arranged to flow between the cooling medium inlet and the cooling medium outlet, around the reaction tubes, so that the reaction tubes are in thermal contact with the cooling medium. The boiling water reactor is adapted to hold catalyst within the tubes and above the tubes on top of the upper tube sheet. Thus, the heat developed by the exothermal reaction in the reaction tubes is transferred through the reaction tube wall to the cooling medium. The boiling water reactor further comprises a reactant by-pass insert mounted at the top of said upper tube sheet adapted to by-pass a part of the reactant from the catalyst arranged on top of the upper tube sheet and into at least a number of the tubes. This ensures that the part of the reactant which is not passed the layer of catalyst arranged on top of the upper tube sheet is not heated notably by the exothermal reaction, it serves as a cooling curtain above the upper tube sheet and within the top part of the reactant tubes in the section where they are connected to the upper tube sheet and thus cools the tube sheet, protecting it from critical high temperatures which may otherwise damage the tube sheet. The part of the reactant which is by-passing the layer of catalyst arranged on top of the upper tube sheet is preferably smaller than the part of the reactant passing through this upper layer of catalyst. Surprisingly it has shown that the by-pass reactant is feasible because the relative loss in capacity because of the by-pass is smaller than the increased capacity of the reactor as a whole due to the possibility of a larger amount of catalyst arranged above the upper tube sheet. Another advantage of the present invention is that it can compensate for shrinkage of the catalyst within the reaction tubes, as the layer of catalyst arranged above the upper tube sheet will sink into the reaction tubes in case of catalyst shrinkage. It is not a precondition for the cooling that the cooling media is boiling.

In an embodiment of the invention, the reactant by-pass insert comprises a plurality of single tube inserts with a lower end diameter smaller than the inner diameter of the top end of the reaction tubes. This ensures that the inserts may fit into the top end of the reactor tube in the upper tube sheet. The difference between the outer dimension of the lower end diameter of the tube insert and the inner diameter of the top end of the reactant tube defines an annulus which controls the amount of by-pass reactant flow cooling the upper tube sheet. Thus, according to the invention, the by-pass can be tailored to fit the relevant process in the reactor. The tube inserts have means for fixing to the top end of the reaction tubes. In an embodiment, the fixing means comprises a top part of the tube inserts with an outer dimension larger than the inner diameter of the top end of the reaction tubes. Accordingly the tube inserts are fixed to the top end of the reaction tubes by means of gravity as the inserts rests on the top part of the tube inserts, however with distance means allowing the suitable by-pass for the process. This distance may be ensured by means of a plurality of bulges on the outer side of the inserts.

In a particular embodiment of the invention, the top part of the tube inserts is hexagon in shape, which ensures only a small gap between the upper part of the inserts. This may be an advantage when loading catalyst into the reactant tubes and the inserts as it minimizes the risk of spilling catalyst between the inserts. The by-pass flow in between the tubes can be controlled by ensuring a certain pressure drop ration between the catalyst pass and the by-pass. The space between the inserted reactant by-pass insert and the reaction tubes can be used to create the pressure drop. However, spacers that hold the tubes can also be used.

In another embodiment of the invention, the reactant by-pass insert comprises a tray of assembled tube inserts for holding catalyst and insertion into the top end of the reaction tubes and apertures in the tray for by-pass of the reactant.

Boiling water reactor according to any of the preceding claims further comprising insertion rings for mounting around the lower end of the reactant by-pass insert, wherein said insertion rings is adapted to adjust the annulus between the lower end of the reactant by-pass insert and the top of the upper tube sheet. These insertion rings may have any suitable shape which allows for the suitable amount of by-pass to flow. For instance the rings may be provided with inner or outer flaps or tongues.

In an embodiment of the invention the reaction tubes have an inner diameter in the range of 20-500 mm, preferably 40-300 mm. But the invention is not limited to only these ranges, since the invention principle works for other tube sizes as well.

FEATURES OF THE INVENTION

1. A boiling water reactor for an exothermal reaction, said reactor comprising,
   a reactor shell having a reactor shell volume arranged to hold a cooling medium under pressure,
   said reactor shell volume comprising at least one cooling medium inlet and at least one cooling medium outlet,
   said reactor shell comprising a reactant inlet and a product outlet,
   a reaction enclosure embedded within said reactor shell volume, said reaction enclosure comprising a reaction zone with a plurality of reaction tubes for holding catalyst within the tubes, an inlet manifold extending between said reactant inlet and said reaction zone, and an outlet manifold extending between said reaction zone and said product outlet, an upper and a lower tube sheet, comprising holes for connection of each end of the reaction tubes to said tube sheets, wherein said cooling medium is arranged to flow between said cooling medium inlet and said cooling medium outlet, around said reaction tubes, so that said reaction tubes are in thermal contact with said cooling medium, wherein the boiling water reactor is adapted to hold catalyst within the tubes and above the tubes on top of the upper tube sheet, and wherein the boiling water reactor further comprises at least one reactant by-pass insert mounted at the top of said upper tube sheet adapted to by-pass a part of the reactant from the catalyst arranged on top of the upper tube sheet and into at least a number of the tubes.

2. Boiling water reactor according to feature 1, wherein said at least one reactant by-pass insert comprises a plurality of single tube inserts with a lower end diameter smaller than the inner diameter of the top end of the reaction tubes and means for fixing said tube inserts to the top end of the reaction tubes.

3. Boiling water reactor according to feature 2, wherein said fixing means comprises a top part of the tube inserts with an outer dimension larger than the inner diameter of the top end of the reaction tubes, whereby the tube inserts are fixed to the top end of the reaction tubes by means of gravity.

4. Boiling water reactor according to feature 2 or 3, wherein said fixing means comprises a plurality of bulges.

5. Boiling water reactor according to feature 2, 3 or 4, wherein the top part of the tube inserts is hexagon in shape.

6. Boiling water reactor according to feature 1, wherein said at least one reactant by-pass insert comprises a tray of assembled tube inserts for holding catalyst and insertion into the top end of the reaction tubes and apertures in the tray for by-pass of the reactant.

7. Boiling water reactor according to any of the preceding features, wherein the area of the annulus between the lower end of the at least one reactant by-pass insert and the top of the upper tube sheet is adapted to control the amount of reactant by-pass into the reaction tubes.

8. Boiling water reactor according to any of the preceding features further comprising insertion rings for mounting around the lower end of the at least one reactant by-pass insert, wherein said insertion rings is adapted to adjust the annulus between the lower end of the at least one reactant by-pass insert and the top of the upper tube sheet.

9. Boiling water reactor according to any of the preceding features, wherein the catalyst can be a methanol catalyst or an SNG catalyst.

10. Boiling water reactor according to any of the preceding features, wherein the reaction tubes have an inner diameter in the range of 30-120 mm, preferably 40-80 mm.

Boiling water reactor according to any of the preceding features, wherein said at least one reactant by-pass insert comprises spacers on the outside to ensure a void between the outside of said at least one reactant by-pass insert and the inner side of the top end of the reaction tubes.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

POSITION NUMBERS

01. Boiling water reactor
02. Reactor shell
03. Reaction tubes
04. Catalyst
05. Upper tube sheet
06. Reactant by-pass insert

DETAILED DESCRIPTION

Figure 1:
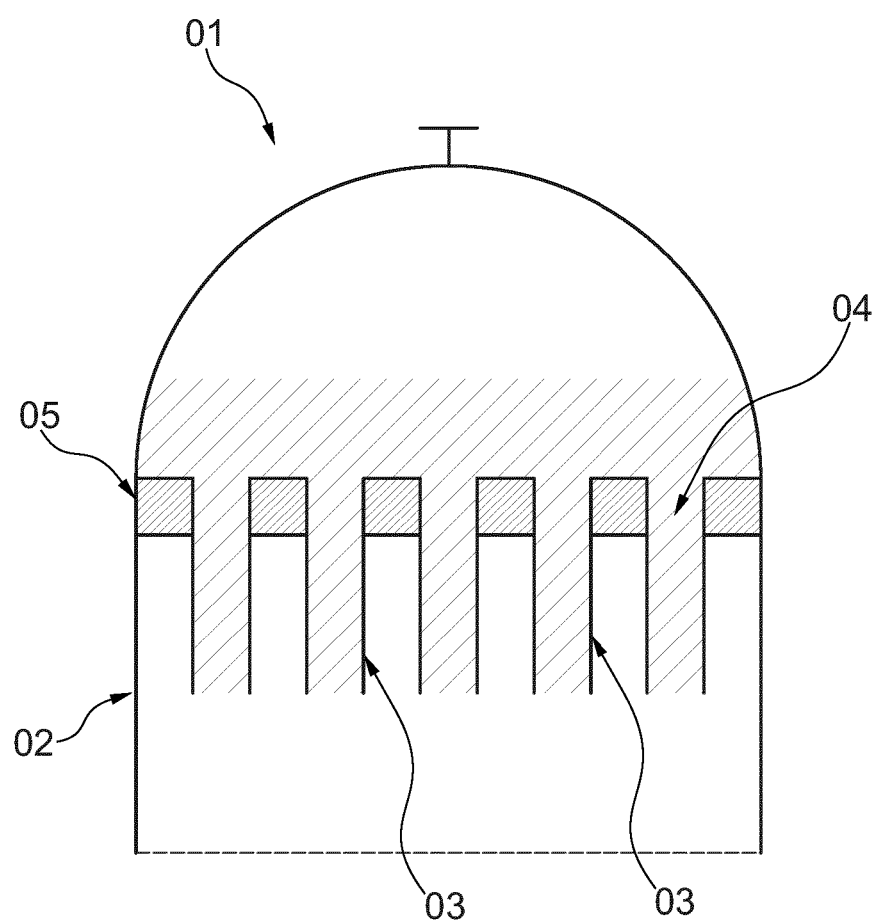
FIG. 1 shows a part view of the top of a boiling water reactor as known in the art.

As known in the art, the capacity of a boiling water reactor 01 can be increased by loading catalyst 04 not only within the reaction tubes 03, but also arranged on the top of the upper tube sheet 05, as shown on FIG. 1 arranging catalyst on top of the tube sheet does not make the reactor as a whole more expensive, since this space within the top dome of the reactor shell 02 would otherwise just remain void. But because some reactions may be strongly exothermal, an amount of heat will then be generated above and on the upper tube sheet which cannot be efficiently removed, since the cooling media is in the section of the boiling water reactor below the upper tube sheet. Thus, a risk emerges that the upper tube sheet may be damaged by the higher temperature. The upper tube sheet is dimensioned to withstand the thermal tensions and process pressure within a certain temperature range. If the temperature rises above this range, the strength of the upper tube sheet decreases, which may led to a critical malfunction and defect.

The present invention offers a solution to this problem by cooling the upper tube sheet by a reactant gas stream which by-passes the catalyst above the tube sheet and in the top part of the reaction tubes, whereby this by-pass stream is not heated by the exothermal reaction in the catalyst near the upper tube sheet. An embodiment is seen on FIG. 2 where a cut of the upper tube sheet and one reaction tube is shown. The reaction tube is mounted with its top end within a hole in the tube sheet. The connection can be made gas tight by means of welding or any other suitable known art method. On top of the upper tube sheet, within the top part of each of the reaction tubes, a reactant by-pass insert 06 is arranged with its lower end inserted into the top part of the reaction tube. Accordingly, the outer dimension of the lower part of the reactant by-pass insert is smaller than the inner dimension of the top part of the reaction tube.

The difference in diameter is chosen not only to ensure fit of the reactant by-pass insert into the reaction tube, but more important to provide an annulus for cooling gas to flow between the plurality of reactant by-pass inserts, on top of the upper tube sheet and within the top part of the reaction tubes which is in thermal contact with the upper tube sheet. As seen on FIG. 2, a major part of the process gas (reactant) is flowing through the inner part of the reactant by-pass inserts. Because the inserts as well as the reaction tubes are filled with catalyst, this major part of the reactant will heat up due to the exothermal reaction with the catalyst. This heated reactant will however not damage the upper tube sheet according to the invention, because of the "curtain" of cooler, not-reacted reactant which flows around the outer side of the reactant by-pass inserts, to the top part of the upper tube sheet and further down the inner wall of the top part of the reaction tubes before the two streams of reactant are finally mixed in the reaction tubes in the quench section. The annulus can be ensured by a number of known art solutions, i.e. bulges on the outside of the reactant by-pass inserts, inserted distance rings with lips, rods welded to the inserts or the like.

Figure 2:
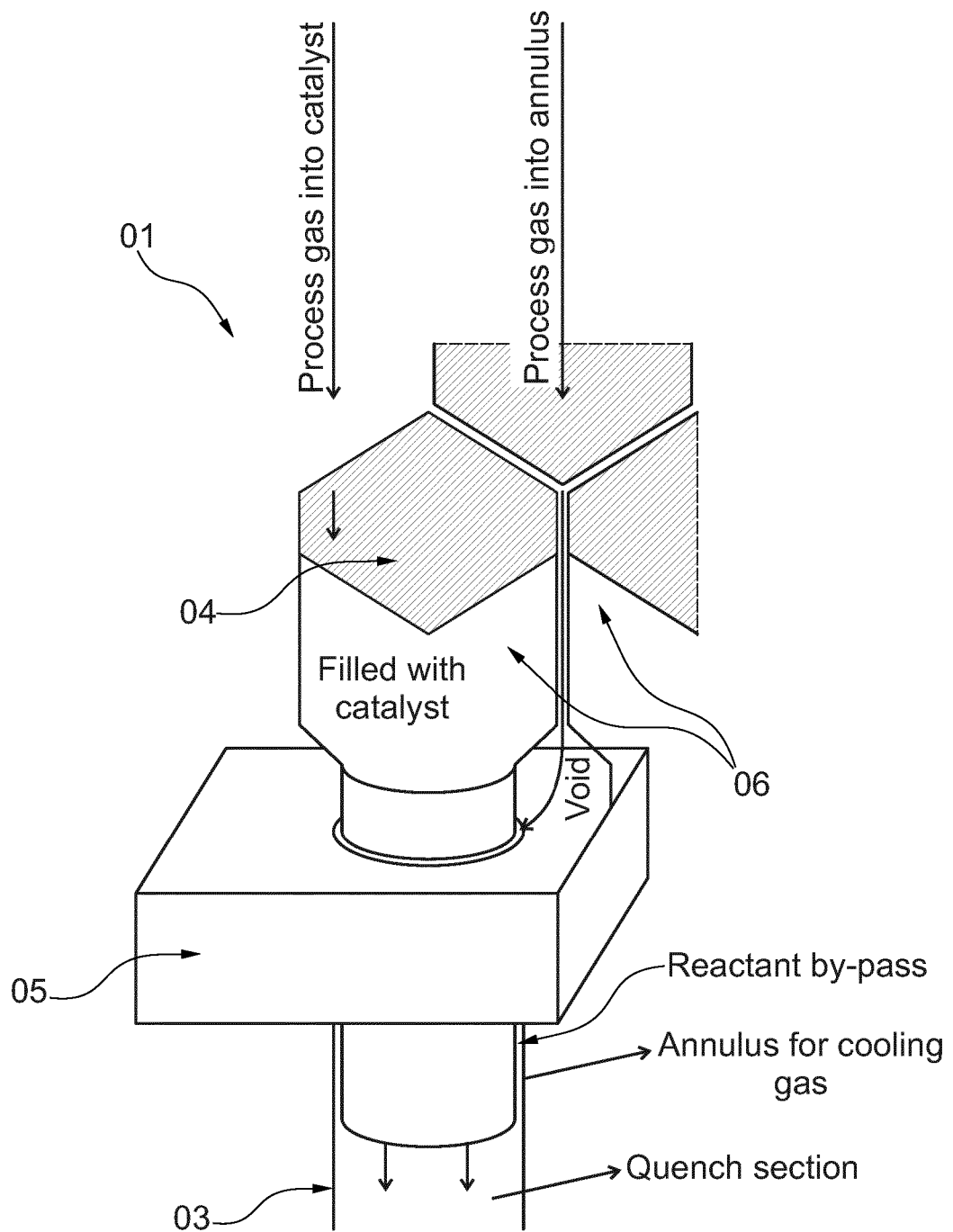
FIG. 2 shows a part view of a section of the top of a boiling water reactor according to the invention.

In the embodiment shown in FIG. 2, the upper part of the reactant by-pass inserts are hexagonal in shape. This provides a close fit between the upper part of the reactant by-pass inserts, only leaving sufficient space between the inserts to ensure passage of the by-pass stream of reactant serving to cool the upper tube sheet. Also this hexagonal shape minimizes the risk of spilling catalyst onto the upper tube sheet, where it would react with the reactant and heat up the upper tube sheet. The shape of the reactant by-pass inserts can however according to the invention have any suitable shape to achieve a low-cost but still efficient solution.

The invention claimed is:

1. A boiling water reactor for an exothermal reaction, said reactor comprising,
   a reactor shell having a reactor shell volume arranged to hold a cooling medium under pressure,
   said reactor shell volume comprising at least one cooling medium inlet and at least one cooling medium outlet,
   said reactor shell comprising a reactant inlet and a product outlet,
   a reaction enclosure embedded within said reactor shell volume, said reaction enclosure comprising a reaction zone with a plurality of reaction tubes for holding catalyst within the tubes, the reaction tubes each having a top part with an inner dimension,
   an inlet manifold extending between said reactant inlet and said reaction zone, and an outlet manifold extending between said reaction zone and said product outlet,
   an upper and a lower tube sheet, comprising holes for connection of each end of the reaction tubes to said tube sheets,
   wherein said cooling medium is arranged to flow between said cooling medium inlet and said cooling medium outlet, around said reaction tubes, so that said reaction tubes are in thermal contact with said cooling medium,
   wherein the boiling water reactor is adapted to hold catalyst within the tubes and above the tubes on top of the upper tube sheet, and
   wherein the boiling water reactor further comprises at least one reactant by-pass insert mounted at the top of said upper tube sheet adapted to by-pass a part of the reactant from the catalyst arranged on top of the upper tube sheet and into at least a number of the tubes, the reactant by-pass insert having a lower end with a dimension smaller than the inner dimension of the top part of the reaction tubes, the difference in dimension between the top part of the reaction tubes and the lower end of the reactant by-pass insert forming an annulus comprising a void for cooling gas to flow between the plurality of reactant by-pass inserts on top of the upper tube sheet and within the top part of the reaction tubes which are in thermal contact with the tube sheet, such that a first portion of process gas flows through an inner part of the reactant by-pass insert and becomes heated due to exothermal reaction with the catalyst, and a second portion of the process gas flows around the reactant by-pass insert to a top part of the upper tube sheet and down an inner wall of the top part of the reaction tubes, thereby providing a curtain of the cooling gas to prevent reactant heat from damaging the upper tube sheet, and
   wherein the by-pass insert is configured such that a flow rate of the second portion of process gas is controlled by ensuring a certain pressure drop ratio between the first portion of process gas and the second portion of process gas.

2. Boiling water reactor according to claim 1, wherein said at least one reactant by-pass insert comprises a plurality of single tube inserts with a lower end diameter smaller than the inner diameter of the top end of the reaction tubes and means for fixing said tube inserts to the top end of the reaction tubes.

3. Boiling water reactor according to claim 2, wherein said means for fixing comprises a top part of the tube inserts with an outer dimension larger than the inner diameter of the top end of the reaction tubes, whereby the tube inserts are fixed to the top end of the reaction tubes by means of gravity.

4. Boiling water reactor according to claim 2, wherein said means for fixing comprises a plurality of bulges.

5. Boiling water reactor according to claim 2, wherein the top part of the tube inserts is hexagon in shape.

6. Boiling water reactor according to claim 1, wherein said at least one reactant by-pass insert comprises a tray of assembled tube inserts for holding catalyst and insertion into the top end of the reaction tubes and apertures in the tray for by-pass of the reactant.

7. Boiling water reactor according to claim 1, wherein the area of the annulus between the lower end of the at least one reactant by-pass insert and the top of the upper tube sheet is adapted to control the amount of reactant by-pass into the reaction tubes.

8. Boiling water reactor according to claim 1, further comprising insertion rings for mounting around the lower end of the at least one reactant by-pass insert, wherein said insertion rings are adapted to adjust the annulus between the lower end of the at least one reactant by-pass insert and the top of the upper tube sheet.

9. Boiling water reactor according to claim 1, wherein the catalyst comprises a methanol catalyst or an SNG catalyst.

10. Boiling water reactor according to claim 1, wherein the reaction tubes have an inner diameter in the range of 30-120 mm.

11. Boiling water reactor according to claim 1, wherein said at least one reactant by-pass insert comprises spacers on the outside to ensure a void between the outside of said at least one reactant by-pass insert and the inner side of the top end of the reaction tubes.

* * * * *